United States Patent
McGee

[15] 3,674,249
[45] July 4, 1972

[54] PNEUMATIC SUSPENSION AXLE RETURN DEVICE

[72] Inventor: Donald J. McGee, Troy, Mich.

[73] Assignee: H & H Equipment Company, Detroit, Mich.

[22] Filed: July 13, 1970

[21] Appl. No.: 54,467

[52] U.S. Cl. .................................267/52, 280/124 R
[51] Int. Cl. .................................................F16f 1/26
[58] Field of Search .................280/124, 81; 267/52, 18, 15, 267/31, 23

[56] References Cited

UNITED STATES PATENTS

| | | | |
|---|---|---|---|
| 3,494,609 | 2/1970 | Harbers | 267/52 |
| 1,832,617 | 11/1931 | Cail | 267/52 |
| 3,093,388 | 6/1963 | Kulyk | 280/81 |

*Primary Examiner*—Philip Goodman
*Attorney*—Whittemore, Hulbert & Belknap

[57] ABSTRACT

Simple two-part seat block and adjustment mounting plate units, as applied between a transverse wheel axle and each of a pair of parallel, leaf-type spring beams, enable an efficient and expeditious two-way adjustment of the positioning of the beams in relation to the axle, and vice versa, as well as air spring units and axle return devices and/or shock absorbers which are (or may be) associated with the beams and axle. Arcuate seats of the blocks matingly receive the axle adjacent opposite frame sides and, when properly positioned on the adjustment plate in a desired transverse and longitudinal relationship to the axle and beams, are tack welded to the top of the plates and to the bottom of the axle. U-bolts then clamp the axle and seat assemblies to the top of the beam.

23 Claims, 5 Drawing Figures

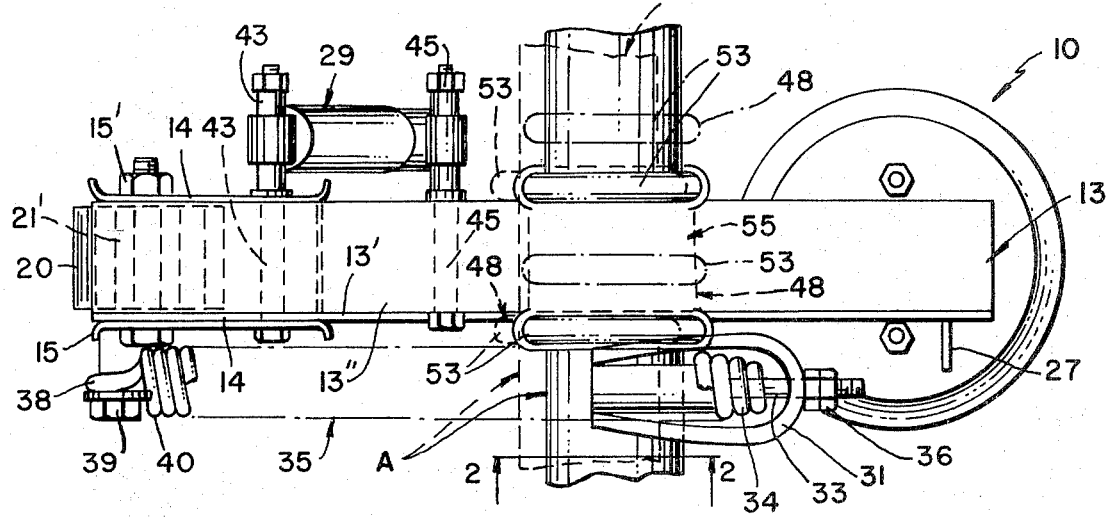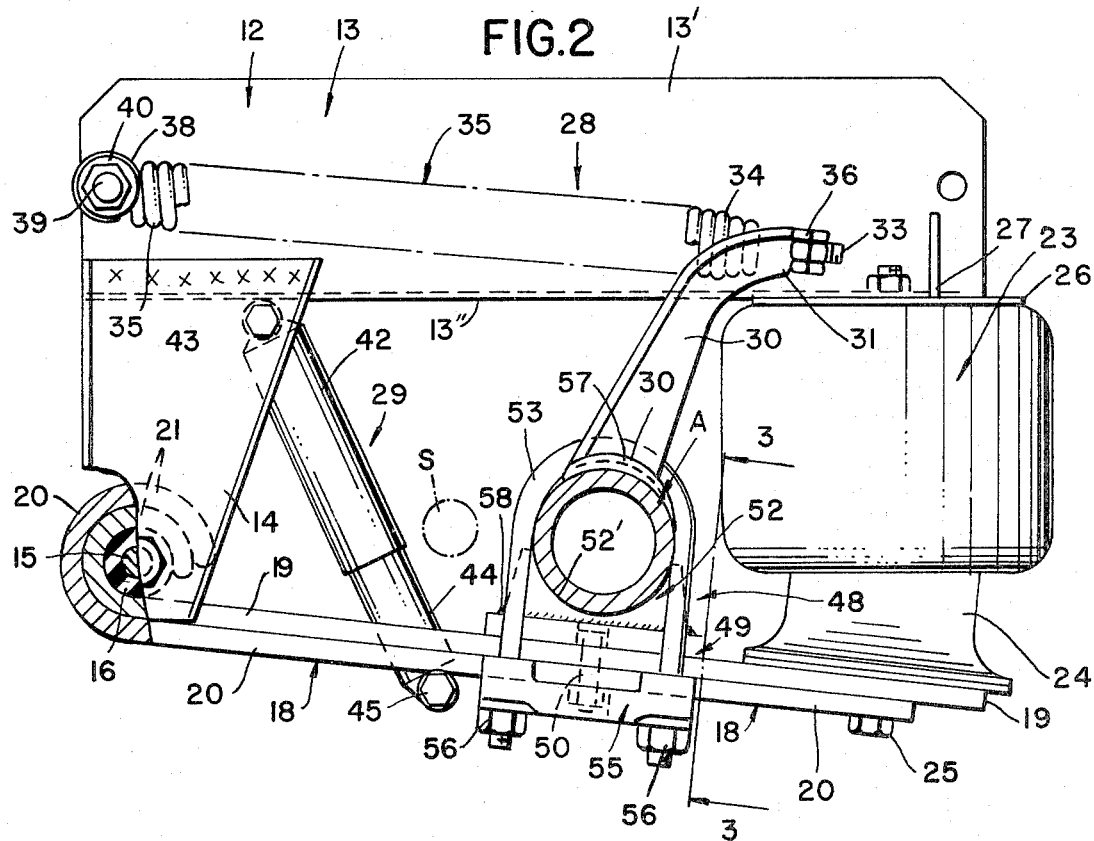
INVENTOR
DONALD J. McGEE
BY *Whittemore Hulbert & Belknap*
ATTORNEYS

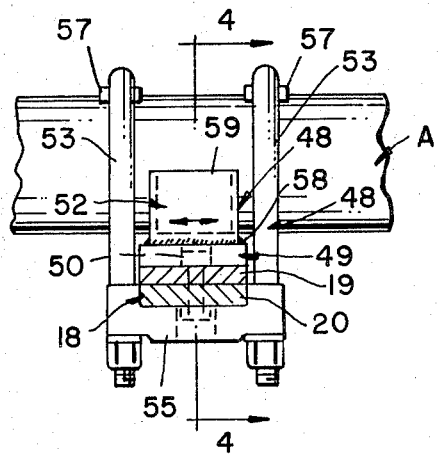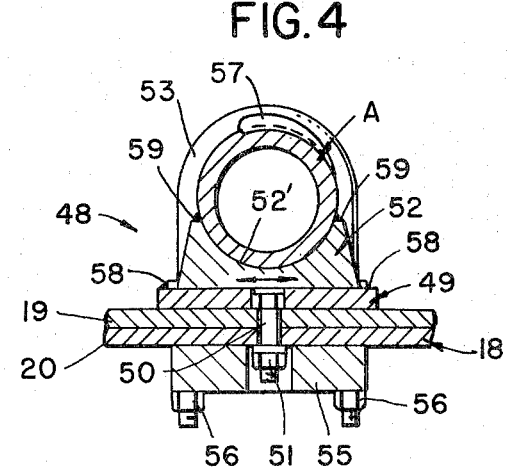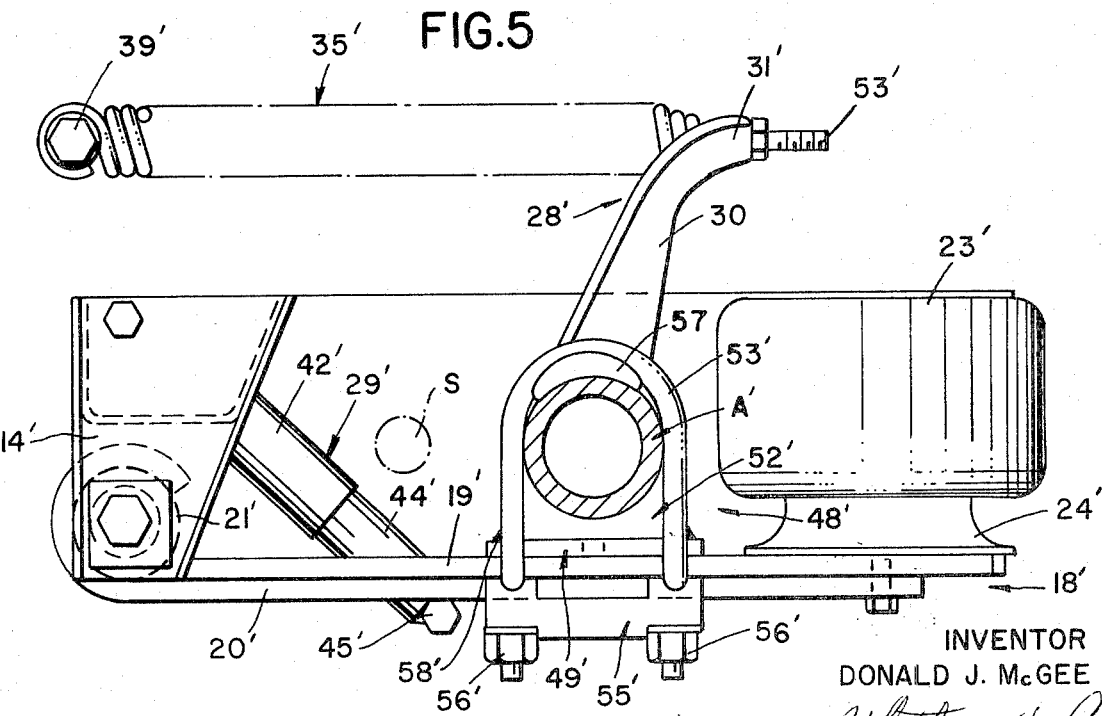

3,674,249

PNEUMATIC SUSPENSION AXLE RETURN DEVICE

BACKGROUND OF THE INVENTION

1. Field of the Invention

The invention finds application in the field of truck or trailer wheel suspensions, in which there may be one or more so-called suspended wheel axles each bearing a portion of the load on the frame, as transmitted through inflated air springs and supporting cantilever or like beams in a "pay" direction of transport, but being elevated above the road or other surface on return trips to minimize tire wear, or when the vehicle is idle. This may optionally be done through the agency of a suitable operator compressing the wholly or partially deflated air springs. The improvement of the invention affords a simple adjustable connection between the suspended axle and a standard spring beam or other equivalent floating mechanical mount of the axle to the frame.

2. Description of the Prior Art

A preliminary investigation has revealed a number of patents with pneumatic suspensions having an axle return feature, among them the U.S. Pats. to Kulyk, No. 3,093,388 of June 6, 1963, and Turner, No. 3,285,621, of Nov. 11, 1966. However, none of the references revealed by the search deal in any degree with any equivalent of the specific adjustable mount which is the subject of the present invention.

SUMMARY OF THE INVENTION

The invention centers upon a very simple axle mounting plate and seat unit or device, by which the connection between an upwardly retractable air bag and spring beam-suspended wheel axle, and a return operator for the latter, may be made at a number of points in reference to the width of the frame (hence the transverse spacing of the longitudinal beams engaged from above by the air bags) and/or the longitudinal spacing of the latter from the axle in the direction of the beam length.

As herein illustrated and described, the suspension arrangement may involve optional spring-biased return lever arms rigidly welded to the suspended axle outwardly of the two vehicle side frame members for elevating the axle upon decompression of the associated air springs, and/or optional shock absorber means connecting the spring beams to an adapter bracket structure rigid with the frame. The actual mounting unit improvement of the invention involves at each of the floating beam supports, a simple rectangular adjustment plate resting on the beam, and an arcuately upwardly concave seat block welded downwardly, when properly adjusted as desired, onto its associated plate, with each seat in turn rigidly welded upwardly to the suspended axle. Further pursuant to the invention, spring tie-bolt units rigidly connect the welded seat and adjustment plate sub-assembly, hence the axle, to the top of the associated spring beam.

Thus the invention affords a customized adjustably positioned, longitudinal-wise and transverse-wise, connection of the axle and beam members, which connection may be quickly made in the field or in the shop, using hand tack welding equipment.

The adjustable mount, as shown and described herein in an optional association with spring-biased lever arm units outside the frame for upwardly retracting the axle when the air springs are deflated, accommodates the usual brake assemblies of the vehicle without interference; and a preferred generally horizontal disposition of coil spring biasing means for the axle lever arms contributes to an economy of space.

BRIEF DESCRIPTION OF THE DRAWINGS

FIG. 1 is a fragmentary top plan view illustrating an air spring suspended truck axle return device in accordance with one embodiment of the invention, optional possible laterally or transversely and longitudinally adjusted positions of the connection between an axle and an air spring mounting beam, these positions being indicated in dot-dash and dotted line, respectively;

FIG. 2 is a view partially broken away in side elevation, or in vertical cross section on line 2—2 of FIG. 1;

FIG. 3 is a fragmentary view in approximately vertical section on line 3—3 of FIG. 2, better illustrating structural features of the adjustable mount of the invention;

FIG. 4 is a view in vertical cross section on line 4—4 of FIG. 3; and

FIG. 5 is a view, generally similar to FIG. 2, illustrating an alternative, and but slightly modified, trailer axle suspension version of the invention.

DESCRIPTION OF A PREFERRED EMBODIMENT

A typical truck suspension assembly employing the improved adjustable axle-beam mounting structure of the invention is generally designated by the reference numeral 10, as shown in FIGS. 1 and 2 of the drawings. For the purpose of illustration, it will be assumed that there will be one such assembly 10 on each of the parallel sides of an ordinary truck frame structure (not shown); and for the purpose of mounting to that structure, each assembly 10 includes a sub-frame plate unit 12 welded, bolted or otherwise rigidly secured to said structure on an outer side of the latter. Unit 12 is herein shown as being in the form of a vertically extending angle member 13 presenting an upwardly elongated and horizontally extending flange 13', and a horizontal portion 13'' coextensive in length therewith, both substantially spanning the longitudinal extent of one of the assemblies.

Each of the latter has an identical spring beam and air spring suspension sub-assembly of more-or-less conventional components which are best illustrated in FIGS. 1 and 2. Thus, each of the angle members 13 has a pair of vertically depending, laterally flanged adapter plates 14 welded to its opposite sides, the connections being assisted by interposed spacing and bracing plate elements as required; and the adapters 14 support adjacent their lower end a transverse hex-headed stud 15, with a nut 15' applied thereto. Each stud is encircled, between its adapter plates 14, by a silent cylindrical rubber sleeve or block bushing 16, which supports the leading end of an elongated leaf spring type of cantilever beam 18.

Each such beam is comprised of upper and lower leaf members 19, 20 of equal width in flat-wise contact with one another, the ends of these members being snugly arced concentrically at 21 about the compressible bushing 16. The rear ends of each of the thus-constituted beams 18 are each engaged from above by a conventional inflatable air spring or cushion unit 23, as by a base 24 of that unit secured by a bolt 25 to the beam end; and the upper end of the unit 23 is rigidly connected to the bottom of the horizontal flange portion 13' of a side angle 13 of the assembly 10, as at a circular top pressure plate 26 of unit 23. A rigidly welded side bracket 27 may assist in the connection. Typically the air spring may have a working height range of 4–11.

The truck suspension assembly 10 herein chosen for illustration is assisted in the return of a trailing axle A from a road engaging position to an elevated position by means of a coil spring biased arm unit, generally designated by the reference numeral 28, and a shock absorber unit 29 of a conventional hydraulic type, whose function is to dampen oscillations in transport, as well as to limit downward extension of the axle.

The spring biased return unit 28 includes an actuator arm 30 which is firmly welded to the top of axle A, as through the agency of an arcuate weld pad 30'. As indicated above, one aspect of the present invention deals only with structural features of the bi-directionally adjustable connection of the cantilever beam unit 18 to the axle A, without regard to the presence or absence of the spring return sub-assembly or unit 28 and/or the shock absorber unit 29. However, the arrangements herein shown and described also present features of practical advantage when one or both of the last named units are employed.

The actuator arm 30 of return unit 28 is, as best shown in FIG. 1, of a special contour including a horizontally looped upper and rearward extension 31 apertured to receive an elongated stud 33; and this stud acts on the tapered forward end 34 of an elongated coil tension spring 35 (FIG. 2). The spring extends rearwardly from a threaded nut and lock nut connection 36 at the loop extension 31 to an anchor at its forward hook 38 on a stud 39 which bolts to angle plate 13, the bolt head taking against a suitable washer 40. A generally horizontal disposition of the spring 35 enables it to exert force on the moment-increasing actuator arm 30 with a maximum economy of space, and without interference with brake and/or operating and drive components, as later mentioned.

In operation, the return unit spring 28, upon a decompression of the air bag 23 under the control of a conventional type of fluid pressure control circuit not germane to the invention, acts through agency of the force-multiplying eccentric actuator arm 30 to elevate the wheel axle A and lift the wheels borne by the axle, out of position for road engagement.

The shock absorber units 29, capable of use with or without the return unit 28, are widely obtainable, each typically including a hydraulic fluid-receiving body 42 which extends downwardly and forwardly from a pivoted stud connection at 43 to the frame bracket sub-structure 14, 14. The unit 19 is completed by another telescoping component 44, which has an appropriate stud connection 45 welded to the bottom of the spring beam 18.

The improved mounting unit which enables a longitudinal and/or transverse adjustment of the connection between the spring beam 18 and the axle A is generally designated by the reference numeral 48. As best illustrated in FIGS. 2, 3 and 4, it comprises a rectangular adjustment plate 49 which seats downwardly upon the upper leaf 19 of the beam 18, and is provided with a center hole to accommodate the head of a bolt or stud 50 rigidly tying the beam leafs 19 and 20 together at a point medial of their combined length; with a nut 51 applied to the lower end of the tie-bolt 49.

An axle-engaging seat or saddle block 52 of the adjustment unit 48 rests atop the adjustment plate 49, the seat block 52 having an arcuately upwardly facing seat surface 52' of somewhat less than 180° arcuate extent, in a radius to matingly receive the bottom half of axle A. A pair of like U-bolts 53 engage over the top of the axle in spaced relation to one another along the axis of the latter, i.e., in the transverse sense in reference to the front-to-rear longitudinal extent of the spring beam 18. The U-bolts project downwardly on either side of the mounting unit 48 (FIG. 3), with their threaded ends projecting through corner holes of a bottom saddle member 55. This member upwardly straddles the width of the beam 18, and nuts 56 applied to the U-bolt ends take them up tightly when the unit 48 has been adjustably positioned and weld-secured as contemplated by the invention, in a manner to be described. The bights of the U-bolts 53 engage the axle through the agency of interposed arcuate cap pads 57 which are concavely mated over a part of the top surface of axle A.

In practicing the invention, with the mounting plate 49 of the unit 48 in place over the beam leaf tie-bolt 50, the seat block member 52 is adjustably positioned in relation to the plate 49 and the axle A and beam 18 so as to effect the desired longitudinal and/or transverse positional adjustment and securement of these components to one another.

Pursuant to the invention, the seat 52 is approximately one-half inch narrower than the plate 49 in the direction of the axle axis, or transversely of the spring beam leafs 19, 20. The seat 52 is also about 1 inch narrower than the plate 49 in the 90° opposite dimension, i.e., longitudinal of the front-rear extent of beam 18. This therefore allows the seat or saddle 52 to be adjustably positioned in one direction or another along the axle length or transversely of the beam length, as indicated by the double-headed arrow in FIG. 3. For the relative dimensions instanced above, this amounts to an adjustment of up to one-fourth inch in either direction transverse of the spring beam 18. Similarly, a longitudinal adjustment in either direction along the beam length, as indicated by the double-headed arrow in FIG. 4, is possible to the extent of up to one-half inch in either such direction.

The adjustment as depicted in FIG. 3 accommodates the beam-to-axle connection 48, as appears in dot-dash line in FIG. 1 for different frame widths of, for example, 34 to 35 inches. The other adjustment as depicted in FIG. 4 (also indicated in dotted line in FIG. L) makes possible a fore and aft adjustment as between vehicle axles and/or the line of vertical action of the air spring unit 23.

With the compounded seat adjustment thus arrived at, the seat block 52 is marginally tack-welded downwardly onto the tap of plate 49, as at 59 (FIGS. 2 and 4); whereupon the seat block is marginally welded at 59 (FIGS. 3 and 4) to the axle A. The U-bolts 53 are then applied to the axle and taken up, thus completing the assembly.

FIG. 5 illustrates a usage of the improvement of the invention in a trailer installation, this embodiment being generally designated 10'. In this distance, it suffices that only a single leaf 20' of the composite beam 18' be wrapped about the resilient sleeve or bushing 16' for a mount to the forward end studs 15'. In all other respects, the features of the invention are identical to those described above in reference to FIGS. 1–4 inclusive. Accordingly, corresponding parts are simply designated by corresponding reference numerals, primed, and further description is dispensed with.

It may be noted that in both FIG. 2 and FIG. 5 the offsetting of the spring return unit 28 to the outside of the sub-frame structure 12 (or 12'), which is itself arranged outside of the frame members proper (not shown) of the vehicle, places those units in a zone in which there is no interference with the vehicle's brake shaft S, the position of which is indicated in dot-dash line, or with other conventional operating components of the brake assembly.

What is claimed is:

1. A unit for use in adjustably connecting a wheel axle or like transversely extending part and a beam or like longitudinally extending part coacting with said first named part in at least partially sustaining a frame structure, said unit being interposed between said parts and comprising a mounting plate member engaging one of said parts, a seat member engaging the other part, said members being adjustably positioned in engagement with one another to obtain a desired positional relationship transverse-wise of said parts to one another, connections including weld means securing said seat and plate members together, as thus adjustably positioned relative to one another, and means for securing the thus-secured members to said respective parts.

2. A unit for use in adjustably connecting a transversely extending wheel axle and a longitudinally extending suspension beam coacting with said axle in at least partially sustaining a frame structure, said unit being interposed between said axle and beam and comprising a mounting plate member engaging said beam, a seat member having an arcuate seat surface matingly engaging said axle, said members being adjustably positioned in engagement with one another to obtain a desired positional relationship, longitudinal-wise and transverse-wise, of said beam and axle to one another, connections including weld means securing said seat and plate members together, as thus adjustably positioned relative to one another, and means for securing the thus-secured members to said axle and beam.

3. A unit for use in adjustably connecting a wheel axle or like transversely extending part and a beam or like longitudinally extending part coacting with said first named part in at least partially sustaining a frame structure, said unit being interposed between said parts and comprising a mounting plate member engaging one of said parts, a seat member engaging the other part, said members being adjustably positioned in engagement with one another to obtain a desired positional relationship of said parts to one another, and connections securing said seat and plate members together, as thus adjustably positioned relative to one another, and for securing the respective members to said parts, said connections including welded unions of said members in engagement with one another as thus adjustably positioned.

4. A unit for use in adjustably connecting a transversely extending wheel axle and a longitudinally extending suspension beam coacting with said axle in at least partially sustaining a frame structure, said unit being interposed between said axle and beam and comprising a mounting plate member engaging said beam, a seat member having an arcuate seat surface matingly engaging said axle, said members being adjustably positioned in engagement with one another to obtain a desired positional relationship of said beam and axle to one another, and connections securing said seat and plate members together, as thus adjustably positioned relative to one another, and for securing the respective members to said axle and beam, said connections including welded unions of said members in engagement with one another as thus adjustably positioned.

5. The unit of claim 3, in which said connections further comprise bolted means connecting the weld-united members between said parts.

6. The unit of claim 4, in which said connections further comprise bolted means connecting the weld-united members between said axle and beam.

7. The unit of claim 3, in which said connections further comprise U-bolt means connecting the weld-united members between said parts.

8. The unit of claim 4, in which said connections further comprise U-bolt means connecting the weld-united members between said axle and beam upwardly encircling the axle.

9. The combination of a unit in accordance with claim 1 with a selectively inflatable and deflatable fluid pressure device interposed and coacting between said frame structure and said one of said parts in the optional sustaining of said structure on the other part.

10. The combination of a unit in accordance with claim 2, with a selectively inflatable and deflatable pressure device interposed and coacting between said frame structure and said beam in the optional sustaining of said structure on said axle.

11. The combination of a unit in accordance with claim 4 with a selectively inflatable and deflatable pressure device interposed and coacting between said frame structure and said beam in the optional sustaining of said structure on said axle.

12. The combination of a unit in accordance with claim 8 with a selectively inflatable and deflatable pressure device interposed and coacting between said frame structure and said beam in the optional sustaining of said structure on said axle.

13. The combination of claim 9, and further comprising a mechanism operatively connected between said frame structure and one of said parts to assist in the operation of said fluid pressure device.

14. The combination of claim 9, and further comprising a spring-biased mechanism acting between said frame structure and said other part to assist in shifting the latter relative to the frame structure when said fluid pressure device is at least partially deflated.

15. The combination of claim 12, and further comprising a spring-biased mechanism acting between said frame structure and said axle to assist in shifting the latter relative to the frame structure when said fluid pressure device is at least partially deflated.

16. The combination of claim 9, and further comprising a shock absorber mechanism operatively connected between said frame structure and one part to stabilize the action of the latter.

17. The combination of claim 12, and further comprising a shock absorber mechanism operatively connected between said frame structure and said beam to stabilize the action of the latter.

18. A unit for use in adjustably connecting a wheel axle or like transversely extending part and a beam or like longitudinally extending part coacting with said first named part in at least partially sustaining a frame structure, said unit being interposed between said parts and comprising a mounting plate member engaging one of said parts, a seat member engaging the other part, said members being adjustably positioned in engagement with one another to obtain a desired positional relationship longitudinal-wise of said parts to one another, connections including weld means securing said seat and plate members together, as thus adjustably positioned relative to one another, and means for securing the thus-secured members to said respective parts.

19. A unit for use in adjustably connecting a wheel axle or like transversely extending part and a beam or like longitudinally extending part coacting with said first named part in at least partially sustaining a frame structure, said unit being interposed between said parts and comprising a mounting plate member engaging one of said parts, a seat member engaging the other part, said members being adjustably positioned in engagement with one another to obtain a desired positional relationship, longitudinal-wise and transverse-wise, of said parts to one another, connections including weld means securing said seat and plate members together, as thus adjustably positioned relative to one another, and means for securing the thus-secured members to said respective parts.

20. The unit of claim 1, in which said seat and mounting members are of different area at an engaged interface thereof to enable a significant relative adjustment thereof in the transverse sense prior to initial welded securement of the members to one another.

21. The unit of claim 2, in which said seat and mounting members are of different area at an engaged interface thereof to enable a significant relative adjustment thereof in the transverse and longitudinal sense prior to initial welded securement of the members to one another.

22. The unit of claim 18, in which said seat and mounting members are of different area at an engaged interface thereof to enable a significant relative adjustment thereof in the longitudinal sense prior to initial welded securement of the members to one another.

23. The unit of claim 19, in which said seat and mounting members are of different area at an engaged interface thereof to enable a significant relative adjustment thereof in the transverse and longitudinal sense prior to initial welded securement of the members to one another.

* * * * *